United States Patent
Widegren

(10) Patent No.: US 6,923,214 B2
(45) Date of Patent: Aug. 2, 2005

(54) DEVICE FOR SERVICING AN AIRCRAFT ON THE GROUND

(75) Inventor: Michael Widegren, Oberursel (DE)

(73) Assignee: Ipalco B.V., Alblasserdam (NL)

( * ) Notice: Subject to any disclaimer, the term of this patent is extended or adjusted under 35 U.S.C. 154(b) by 15 days.

(21) Appl. No.: 10/481,292

(22) PCT Filed: Jun. 19, 2002

(86) PCT No.: PCT/EP02/06782
§ 371 (c)(1),
(2), (4) Date: May 19, 2004

(87) PCT Pub. No.: WO03/000549
PCT Pub. Date: Jan. 3, 2003

(65) Prior Publication Data
US 2004/0195066 A1 Oct. 7, 2004

(30) Foreign Application Priority Data
Jun. 22, 2001 (LU) .................................. 90792

(51) Int. Cl.$^7$ ............................................. A01G 25/09
(52) U.S. Cl. ............................ 137/899.2; 137/355.26; 212/324; 182/194; 182/324
(58) Field of Search ...................... 137/355.16, 355.26, 137/899.2, 355.12; 212/324; 182/194, 222

(56) References Cited

U.S. PATENT DOCUMENTS

| | | | |
|---|---|---|---|
| 2,531,001 A | | 11/1950 | Short |
| 2,876,963 A | * | 3/1959 | Se Legue et al. ................ 244/3 |
| 3,807,437 A | | 4/1974 | Lenten |
| 4,526,090 A | * | 7/1985 | Maier .......................... 454/119 |
| 4,692,569 A | | 9/1987 | Winner |
| 4,730,089 A | * | 3/1988 | Pepper ....................... 191/12.4 |
| 6,371,148 B1 | * | 4/2002 | Tripp ....................... 137/15.01 |
| 2002/0079163 A1 | * | 6/2002 | Figura et al. ................. 182/2.5 |

FOREIGN PATENT DOCUMENTS

| | | |
|---|---|---|
| DE | 3743393 | 3/1989 |
| JP | 09194147 | 7/1997 |
| WO | WO 86/05632 | 9/1986 |
| WO | WO 99/36316 | 7/1999 |

* cited by examiner

Primary Examiner—A. Michael Chambers
(74) Attorney, Agent, or Firm—McCormick, Paulding & Huber LLP

(57) ABSTRACT

A device for servicing an aircraft on the ground includes a rolling support and a cable or hose assembly having a first end for connection to a ground unit and an opposite second end for connection to the aircraft. A reel is rotatably mounted on the rolling support on which the cable or hose assembly is wound, and from which the cable or hose assembly can be unwound from the first end. A flight of stairs is also mounted on the rolling support.

10 Claims, 1 Drawing Sheet

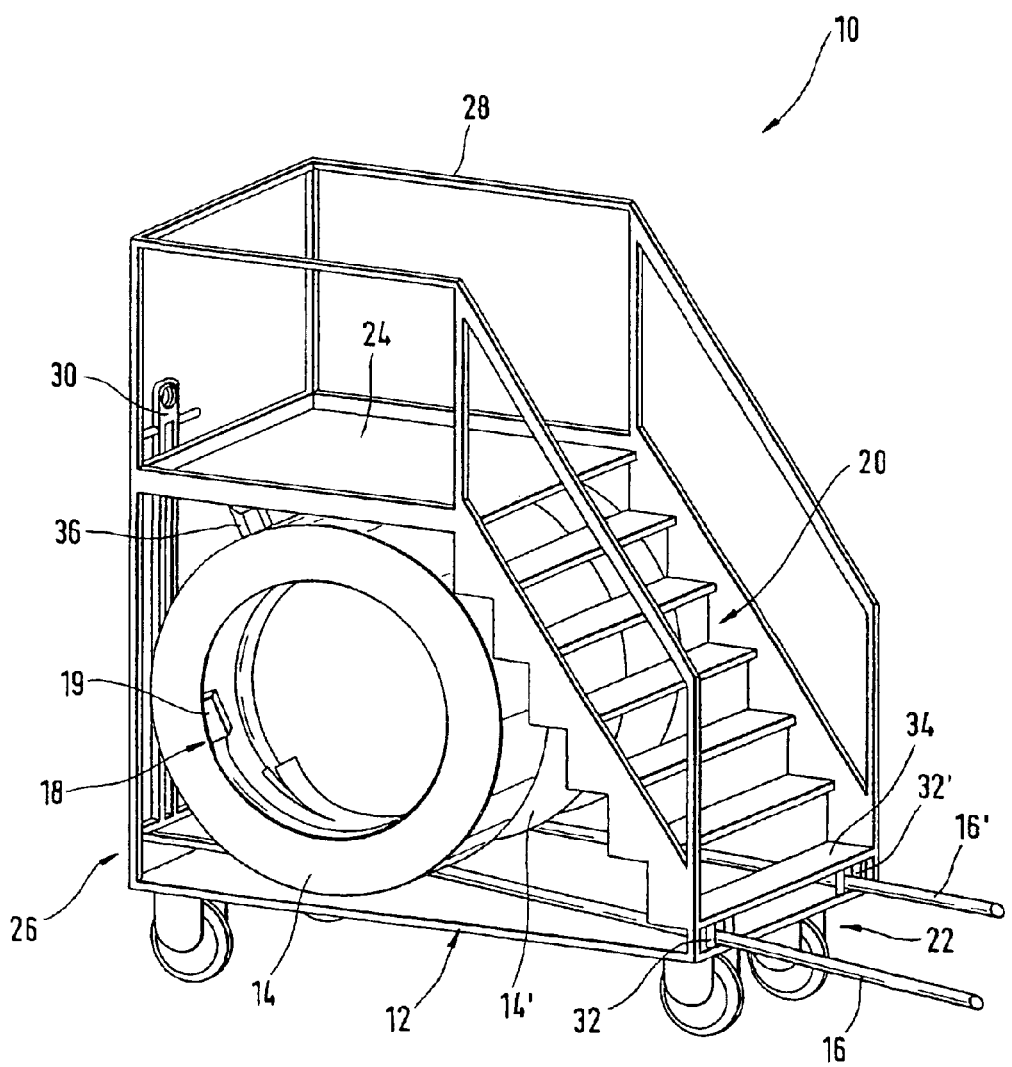

DEVICE FOR SERVICING AN AIRCRAFT ON THE GROUND

CROSS-REFERENCE TO RELATED APPLICATIONS

This application is entitled to the benefit of and incorporates by reference in their entireties essential subject matter disclosed in International Application No. PCT/EP02/06782 filed on Jun. 19, 2002 and Luxembourg Patent Application No. 90792 filed on Jun. 22, 2001.

FIELD OF THE INVENTION

The present invention relates to a device for servicing an aircraft on the ground.

BACKGROUND OF THE INVENTION

When an aircraft is parked on the ground, the ground staff in charge of aircraft servicing has to carry out a number of duties such as e.g. supplying power to the aircraft, discharging waste water and filling up water and compressed air.

Electrical power supply is generally achieved via an electrical cable assembly. A first end of the cable assembly is connected to a ground power supply unit and the second end is plugged into a receptacle in the body of the airplane. The cable assembly is typically stored in a storage device, such as e.g. a reel, from which it can be unwound, while the first end of the cable assembly remains connected to the ground power supply. Such a storage device, described e.g. in U.S. Pat. No. 4,730,089, is generally located at or close to the passenger bridge and allows to keep the cable assembly off the ground and out of the way of planes or other vehicles until it is needed. It also allows the cable assembly to be supported as it is pulled out to a waiting aircraft. When the cable assembly is needed to supply power to an aircraft, it is pulled from the storage device, across the apron and plugged into the aircraft by a ground technician. The latter then has to turn on a switch either located about the plug or near the cable storage device to apply a voltage to the cable assembly so that power is supplied to the aircraft. When the aircraft has been serviced, the technician turns off the power, disconnects the cable from the aircraft, and operates a motor at the storage device to retract the cable assembly thereto.

Unfortunately, when the cable assembly is stored in the above described storage device, connection of an aircraft to the power supply is often too time consuming. Indeed, when the cable assembly is pulled from the storage device, it frequently gets stuck in the storage device, e.g. due to twisting. The ground technician thus has to walk back to the storage device to take care of the problem, before continuing with the connection.

Moreover, depending on the type of aircraft, the technician may have difficulties in connecting the cable assembly to the aircraft, principally because the connection has to be done at a relatively high level above ground. This again results in a waste of time.

Furthermore, it is to be noted that storing the cable in such a storage device causes a rapid wear of the cable. Indeed, whether the cable is pulled from the storage device or retracted thereto, it is always dragged on the ground. This causes extensive abrasion of the cable assembly, which thus needs to be replaced regularly for safety reasons.

These problems of handling, storage, connection and wear encountered with electric cables are similar with the hoses used to connect the aircraft to ground units such as water supply unit, compressed air unit and waste water collecting unit.

WO 99/36316 discloses an aircraft refueling cart, which includes a chassis with wheels and a refueling platform upon which an operator can stand. The platform is mounted to the chassis by a scissor-action mechanism, so as to vary the height of the platform. The cart further includes a short-length hydrant hose, which is removably supported around the periphery of the cart in its rest position. Fuel is supplied to the cart via this hydrant hose and is further conveyed to the aircraft via a boom and fuel hose. On the cart, the fuel supplied by the hydrant hose flows through a surge suppressor, a filter and a fuel meter, before entering the boom. The cart further includes a hose reel on which a hose is wound. This hose has a first end connected downstream of the fuel meter and an opposite, free second end.

OBJECT AND SUMMARY OF THE INVENTION

The technical problem underlying the present invention is to provide a device for servicing an aircraft on the ground, which facilitates the work of the ground staff and which allows a more proper handling of the cable or hose assemblies used for servicing the aircraft. This problem is solved by a device for servicing an aircraft on the ground in accordance with the present invention.

According to the present invention, a device for servicing an aircraft on the ground comprises a rolling support on which a reel is rotatably mounted. In order to connect the aircraft to a ground unit, a cable assembly or hose assembly is wound up on the reel, from which it can be unwound when needed. This cable or hose assembly has a first end for connection to the ground unit and a second end for connection to the aircraft. The cable or hose assembly is wound up on the reel in such a way that it can be unwound from the first end. The device further comprises a flight of stairs mounted on the rolling support.

In case the device of the invention is intended to supply power to an aircraft, a cable assembly is wound on the reel. Such a device proves advantageous for a ground technician in charge of the electrical connection of an aircraft, as it is more handy to use than conventional storage devices. When the device is not in use, it can be parked nearby the ground power supply unit, so that it may be permanently connected thereto. The cable assembly is kept out of the way of planes or other vehicles. When the device is needed to supply power to an aircraft, a ground technician moves the device towards the aircraft. As the device is moved away from the ground power supply unit, the cable is unwound from the reel, since its first end is preferably permanently connected to the ground power supply unit. During unwinding of the cable, the technician can keep an eye on the reel to avoid any twisting of the cable. Moreover, should the cable get stuck, the reel is directly within reach for rapidly solving the problem. Besides, it is to be noted that once arrived at the aircraft, the flight of steps allows the technician to climb up for easier connection of the cable assembly to the aircraft. As a result, electrical connection of the aircraft is faster and more easily achieved.

Another advantageous aspect of the device of the invention is that when winding up or unwinding the cable from the reel, it is not dragged on the ground. Indeed, as the reel is supported on the rolling support, the cable is progressively laid on the ground as the device is moved towards the aircraft.

If instead of a cable assembly, a flexible hose assembly is wound up on the reel, it is possible to connect the first end of the flexible hose to a ground unit such as e.g. a fresh water supply unit, a compressed air supply unit, or a waste water collecting unit, so as to supply water or compressed air to the aircraft, or discharge waste water. As for electric cables, the present device equipped with a hose proves extremely advantageous regarding the handling, storage and connection of the hose.

It is clear that a cable assembly, respectively a hose assembly, may comprise one or more cables, respectively hoses.

Advantageously, the device includes a motor coupled to the reel for rotating the latter so as to easily wind and/or unwind the cable or hose assembly.

The flight of stairs is preferably configured in such manner as to rise from a rear side of the rolling support to an elevated platform on a front side of the rolling support. This elevated platform provides an elevated working area, on which a ground technician can easily proceed to the connection of the cable or hose assembly to the aircraft.

For security, the flight of stairs and the elevated platform are advantageously bordered by a side rail.

In order to easily move the device, a pivotable draw-bar may be connected to the rolling support.

Preferably, the device further comprises a guide element arranged at the periphery of the rolling support. This guide element is arranged in the rolling support in such a way as to avoid twisting of the cable or hose assembly as it is wound up or unwound.

It is clear that the first end of the cable or hose assembly shall advantageously comprise connection means for the ground unit and its second end shall comprise a plug. It is to be noted that, as the cable assembly is not dragged on the floor, there is no risk of damaging the plug.

Depending on the type of aircraft, it may happen that the power supply has to be carried out via e.g. two cable assemblies because the aircraft has two sockets, generally about the same location. In such a case, the present device should be provided with one other cable assembly having a first end for connection to a ground unit and an opposite second end for connection to the aircraft, which is also wound on the first reel or wound on a second reel. This allows a ground technician to easily bring two cable assemblies simultaneously to an aircraft requiring two separate connections. When the device is equipped with a motor for winding up or unwinding the first reel, the second reel may be of course also be coupled to the motor.

It is clear that it is possible to equip the present device with more than two cable assemblies, either wound on the same reel or on different reels. The present device can also be equipped with a plurality of hose assemblies, in order to achieve multiple connections for supplying or discharging a variety of fluids. Furthermore, it would be possible to equip the present device with a combination of cable and hose assemblies, wound on one or more reels. However, in practice, it is desirable to have one device for each task, i.e. one device for supplying power to the aircraft, one device for supplying fresh water, etc. . . .

When the present device is equipped with a plurality of cable or hose assemblies, a conventional slip ring unit or hydraulic swivel joint is preferably mounted in the device. Indeed, a slip ring unit permits to transmit electric current from a cable wound on the rotatable reel to an immobile part, from which a connection cable extends, so that power can be applied to the connection cable, which does however not rotate with the reel. For a fluid, the same object is achieved by means of a hydraulic swivel joint. Hence, the second end of each cable or hose assembly is connected to the slip ring unit or the hydraulic swivel joint, and the latter advantageously comprise, for each cable or hose assembly, one connection cable or hose ending with a plug to be connected to the aircraft.

It will be understood that, although the ground units are generally located about the passenger bridge, they could be located at any place on the apron. Moreover, in case an aircraft to be serviced is parked far away from the ground unit to which the device has to be connected, the first end of the cable or hose may be connected to the ground unit via an extension cable or an extension hose.

BRIEF DESCRIPTION OF THE DRAWINGS

The present invention will now be described, by way of example, with reference to the accompanying drawing, in which:

FIG. 1: is a three-dimensional view of a preferred embodiment of a device for supplying power to an aircraft on the ground in accordance with the invention.

DETAILED DESCRIPTION OF A PREFERRED EMBODIMENT

FIG. 1 shows a preferred embodiment of a device 10 for servicing an aircraft in accordance with the invention, which is embodied as a device for supplying power to an aircraft on the ground. This device comprises a rolling support 12 on which two reels 14 and 14' are rotatably mounted. On each reel 14 and 14' is stored a cable assembly, indicated 16 and 16' respectively, each cable assembly 16, resp. 16', having a first end (not shown) for connection to a ground power supply (not shown) and a second end 18 (only the second end 18 of the cable assembly 16 is shown in the figure) advantageously equipped with a plug 19 for connection to the aircraft. Generally, the cable assembly 16, 16' is wound up on the reel 14, 14' when the device 10 is not needed, and can be unwound therefrom when needed.

The device 10 further comprises a flight of stairs 20, which rises from a rear side 22 of the rolling support 12 to an elevated platform 24 on a front side 26 of the rolling support 12. For security reasons, a side rail 28 preferably borders the flight of stairs 20 and the elevated platform 24. It will be noted that in order to have a compact device 10, the reels 14 and 14' are advantageously arranged below the elevated platform 24 and the flight of stairs 20.

The present device 10 is particularly suited for supplying power to an aircraft requiring two separate connections, since it is provided wit tho cable assemblies. However, it is clear that the present device 10 can also be used to connect an aircraft requiring a single connection.

When the device 10 is not in use, it can be parked nearby the ground power supply, so that the first end of each cable assembly 16 and 16' may permanently be connected to the ground power supply, while each cable assembly 16, resp. 16', is wound up on its respective reel 14, 14'. The cable assemblies 16 and 16' are then kept of the way of planes or other vehicles.

When the device 10 is needed to supply power to an aircraft, a ground technician moves it towards the aircraft by means of e.g. a pivotable draw-bar 30 connected to the rolling support 12. As the device 10 is moved away from the ground power supply, the cable assemblies 16 and 16' are unwound from their reels 14 and 14' since their first ends are connected to the ground power supply. As can be seen on FIG. 1, the cable assemblies 16 and 16' are advantageously arranged on the reels 14 and 14' in such a way that most of their length can be wound on the outer cylindrical surface of the reel 14, so as to be unwound when the device is moved. Moreover, the cable assembly 16 is arranged in such a way that a certain portion of the cable, ending with the plug 19, is rolled up on the inner side of the reel 14. This portion of the cable assembly 16 thus remains in the reel 14 while the device is moved. Although not shown, the cable assembly 16' is also arranged in this way in reel 14'.

It is to be noted that with the present device 10, the cable assemblies 16 and 16' are progressively laid on the ground as the device 10 is moved towards the aircraft. They are not anymore dragged on the ground, which means that they are not subjected to abrasion due to rubbing on the ground. Moreover, having the plug 19 in the reel 14 when the device 10 is moved, permits to avoid severe damage to the plug 19 due to dragging on the ground. Also, as the plug 19 is not dragged through e.g. puddles, it is safer from an electrical point of view.

Reference numbers 32 and 32' indicate a set of cable guide elements facing the outer cylindrical surfaces of reels 14 and 14'. These cable guide elements 32 and 32' ensure a proper alignment of the cable assemblies 16 and 16', whether the latter are being wind up on their respective reel 14, resp. 14', or unwound therefrom. As can be seen, the cable guide elements 32 and 32' are arranged at the rear side 22 of the rolling support 12, under the lowest step 34 of the flight of stairs 20. This avoids any entanglement between the two cable assemblies 16 and 16'.

Once arrived at the aircraft, the ground technician connects the second end 18 of the cable assembly 16, 16' into a socket (not shown) in the aircraft. It will be appreciated that the elevated platform 24 provides an elevated working area from which the ground technician can easily proceed to the connection of the cable assembly 16, 16' to the aircraft when the connection has to be done at a relatively high level above ground.

The ground technician then generally turns on a switch either located e.g. on the plug 19 or near the ground power supply to apply a voltage to the cable assembly 16, resp. 16', so that power is supplied to the aircraft.

When the aircraft has been serviced, the ground technician turns off the power, disconnects the cable assemblies 16 and 16' from the aircraft and moves the device 10 back to the ground power supply while the cable assemblies 16 and 16' are wound up on their respective reels 14 and 14'.

It will be noted that in order to easily wind and/or unwind the cable assemblies 16 and 16', the device 10 may be advantageously provided with a motor. In the device 10, this motor is arranged under the platform 24 and coupled to the reels 14 and 14' by means of a driving belt 36.

The motor may e.g. be supplied with power from the ground power unit. In such a case it is preferable to turn off the power—before disconnecting the plug 19—by means of a switch at the plug 19, rather than to turn off the power at the ground unit, which would also suppress the power in the cable assembly. When a slip ring unit is mounted in the device, power can easily be supplied to the motor by connecting it to the slip ring unit.

It is clear that instead of cable assemblies, hose assemblies could be wound on the reels in order to supply the aircraft with a fluid, such as e.g. fresh water or compressed air, or to remove a fluid therefrom.

What is claimed is:

1. A device for supplying power to an aircraft on the ground comprising:
    a rolling support;
    an electric cable assembly having a first end for connection to a ground power supply unit and an opposite second end for connection to said aircraft;
    a reel rotatably mounted on said rolling support, on which said cable assembly is wound and from which said cable assembly can be unwound from its first end; and
    a flight of stairs mounted on said rolling support.

2. The device according to claim 1, further comprising a motor coupled to said reel for rotating said reel.

3. The device according to claim 1, wherein said rolling support has a front side and an opposite rear side and said device comprises an elevated platform, said flight of stairs rising from said rear side of said rolling support to said elevated platform on said front side.

4. The device as claimed in claim 3, wherein said flight of stairs and said elevated platform are bordered by a side rail.

5. The device according to claim 1, further comprising a pivotable draw-bar connected to said rolling support.

6. The device according to claim 1, further comprising a cable assembly guide element arranged at the periphery of said rolling support.

7. The device according to claim 1, wherein said first end of said cable assembly comprises connection means for said ground power supply unit and said second end comprises a plug.

8. The device according to claim 1, comprising at least one other cable assembly having a first end for connection to a ground power supply unit and an opposite second end for connection to said aircraft, which is wound on the first reel or on another reel.

9. The device according to claim 8, wherein said first reel is coupled to a motor for its rotation and said other reel is coupled to said motor.

10. The device as claimed in claim 1, wherein said second end of each cable assembly is connected to said aircraft via a slip ring unit or a hydraulic swivel joint.

* * * * *